(12) United States Patent
Kleiger et al.

(10) Patent No.: US 7,993,441 B2
(45) Date of Patent: Aug. 9, 2011

(54) ROADWAY PATCHING COMPOSITION

(75) Inventors: Scott P. Kleiger, Harleysville, PA (US); Lewis Tarlini, Bensalem, PA (US)

(73) Assignee: Patch Management, Inc., Morrisville, PA (US)

( * ) Notice: Subject to any disclaimer, the term of this patent is extended or adjusted under 35 U.S.C. 154(b) by 242 days.

(21) Appl. No.: 12/207,119

(22) Filed: Sep. 9, 2008

(65) Prior Publication Data
US 2009/0064901 A1 Mar. 12, 2009

Related U.S. Application Data

(60) Provisional application No. 60/993,590, filed on Sep. 12, 2007.

(51) Int. Cl.
*C08L 95/00* (2006.01)

(52) U.S. Cl. ...................................... 106/277; 106/284.4

(58) Field of Classification Search .................. 106/277, 106/284.4
See application file for complete search history.

(56) References Cited

U.S. PATENT DOCUMENTS

| | | | | |
|---|---|---|---|---|
| 3,126,350 A | * | 3/1964 | Borgfeldt | 106/277 |
| 3,565,842 A | * | 2/1971 | Pitchford | 524/61 |
| 3,867,162 A | * | 2/1975 | Elste, Jr. | 106/277 |
| 3,957,524 A | * | 5/1976 | Doughty et al. | 106/277 |
| 4,456,633 A | * | 6/1984 | Grossi et al. | 427/138 |
| 4,647,606 A | * | 3/1987 | Hahn et al. | 524/62 |
| 5,212,220 A | * | 5/1993 | Gelles | 524/68 |
| 6,077,888 A | * | 6/2000 | Schilling | 106/277 |

* cited by examiner

*Primary Examiner* — Helene Klemanski
(74) *Attorney, Agent, or Firm* — Volpe and Koenig P.C.

(57) ABSTRACT

An asphalt based mixture, which is an oil and water emulsion, comprises 15-30% V water; 34 to 80% asphalt cement dispersed as asphalt cement droplets; and 20-66% V emulsifiers. Other materials are selectively added to the composition to improve characteristics including stability, viscosity, cohesion, adhesion and resistance to cracking.

9 Claims, No Drawings

ROADWAY PATCHING COMPOSITION

CROSS REFERENCE TO RELATED APPLICATION

This application claims the benefit of U.S. Provisional Application No. 60/993,590, filed Sep. 12, 2007, which is incorporated by reference as if fully set forth.

FIELD OF INVENTION

The invention relates to an asphalt composition for patching roadways and the like and more particularly to a composition which is usable and remains stable over a large climate range.

BACKGROUND

Asphalt is a dark brown to black viscous hydrocarbon present in most crude petroleum and in some natural deposits. It is soluble in petroleum products and is generally a byproduct of the petroleum distillation process. Asphalt is often confused with tar, which is produced by coal distillation. Tar is also resistant to petroleum productions.

Generally, asphalt is a waste product from the refinery processing of crude oil and is often called the "bottom of the barrel." Its boiling point is typically about 350° C. but can be as high as 440° C. Due to its hydrophobic and good adhesive characteristics it is widely used as a binder or cement for stone and rock aggregate in paving and road repair. The term "asphalt cement" (AC) refers to asphalt that has been prepared for use in hot mix asphalt (HMA) and for other paving applications. Asphalt's main components generally comprise: asphaltenes, which are large discrete solid inclusions highly viscous resins which are semi-solid or solid at room temperatures or fluidized when heated, they also become brittle when cold; and oils which are colorless, soluble in most solvents and allow the asphalt to flow.

Approximately 80% of the asphalt consumed in the U.S. is used in road paving. Asphalt road surfaces are widely recycled in the U.S. Approximately 80% of the asphalt from road surfaces that is removed each year is reused as part of the new road, road bed or embankment.

Potholes tend to form in cold weather after a period of snow and ice followed by a thaw. Public crews often have to work in adverse weather, dangerous traffic conditions and need to work on several potholes that appear almost overnight, after a thaw.

Asphalt emulsions that are used in road construction become unstable when ambient temperatures fall below 10° C. As a result, road construction and asphalt manufacturing typically comes to a halt when ambient temperatures are expected to remain at or below 10° C.

In the early 1980s, a new technology to repair potholes was introduced. The process was known as spray injection patching. The process was introduced as a way to perform pothole repairs on roadway surfaces without the need of multiple pieces of expensive equipment, without requiring multiple employees standing on the highway, exposed to traffic and bad weather to repair potholes and the like. When this process was initially introduced, standard asphalt emulsion materials were used. However, there were operational complexities immediately recognized. Thorough cleaning of the emulsion circuit was required on a daily basis, otherwise the equipment could not be used the following day. It was also discovered that the asphalt emulsion characteristics vary by manufacturer, and as a result, the ability to maintain consistent spray patterns and achieve reliability of the equipment presented many challenges.

Asphalt emulsions used in the construction industry have various formulations that are tailored to the various applications, e.g. roofing, flooring, waterproofing, etc. The formulations have different types and amounts of bitumen grades, additives, emulsifiers, etc. depending on the application. Such variations change the physical properties of the emulsion which in turn can change the methods and equipment for handling the material.

As a result of these circumstances and the other known issues of emulsion materials, i.e. the temperature and water issues that are known to the asphalt industry, the injection spray repair process must overcome significant obstacles. Furthermore, such repair systems presently in use are typically performed only when ambient temperature is above 10° C. in order to assure ease of application and to obtain reliable repairs. Such limitations greatly hamper repair and limits the amount of time one is able to work in repairing potholes. It is therefore the goal of the present invention to overcome these obstacles and to provide a composition which may be safely and reliably used at temperatures well below 50° F. and more specifically within a range of −17° F. to 45° F. which occurs, in North America, for example, between October and April, when potholes and the like are known to occur and to require filling and/or repair.

SUMMARY

The present invention is an asphalt based emulsion mixture, which is an oil in water emulsion, water being the continuous phase of the emulsion, and dispersed asphalt cement (AC) droplets being the intermediate phase of the emulsion. The asphalt cement comprises 34 to 80% by volume of the intermediate phase selected from the following:
  AC-5 Asphalt Mixture;
  AC-10 Asphalt Mixture;
  AC-20 Asphalt Mixture;
  AC-30 Asphalt Mixture;
  Grade Binder; or a combination thereof.

The emulsion further comprises 0.15-2.5% V emulsifiers selected from the following:
  alkyl amines;
  tallow diamine;
  quaternary amines; or a combination thereof.

The emulsifiers are activated by interaction with acids, e.g., hydrochloric, phosphoric, acetic, sulfuric, etc.

DETAILED DESCRIPTION OF THE PREFERRED EMBODIMENTS

The following acronyms are used in the present application:
  AC—asphalt cement
  AR—aged residue
  PG—penetration grade (or Pen. Grade)
  PGB—penetration grade bitumen The initial aspect of one embodiment relates to an emulsion that remains stable below 50° F. and that would also be capable of being used as a spray even in wet environments. A further aspect is to provide an asphalt emulsion, which does not contain detectable amounts of hazardous material. The emulsion is an oil and water emulsion, water being the continuous phase and dispersed asphalt cement droplets as the intermediate phase. It has been discovered that bitumen is an ideal binder. Bitumen is available in a range of "penetration grades" or "PG" as related to a specific test that determines the penetration grade of a given bitumen. Generally, this refers to the softness or how far a point load can sink into a block of pure bitumen at a normal temperature. The Pen. grade of bitumen is a value which can range between 15 Pen. grade, which is rigid, to 450 Pen. grade, which is relatively soft.

Various grades of asphalt mixtures are also similarly categorized. These designations are AC-5, AC-10, AC-20, AC-30, etc. Further, grades of asphalt have also been designated by AR 4000, AR 8000. The AC employed herein further includes: 65-70 Pen. Grade Bitumen: and 85-100 Pen. Grade Bitumen: 64-22 Performance Grade Binder; 5-22 Performance Grade Binder; 67-22 Performance Grade Binder; 76-22 Performance Grade Binder; or combinations thereof. Other components of asphalt are asphalt binders which are given ratings of performance grade or "PG." The first number in the rating is called the high temperature grade. This is the upper temperature limit at which the binder still possesses adequate physical properties. The second number is the low temperature grade, i.e., that the binder still possesses adequate physical properties, down to that lower limit. For example, a PG 64-22 has a high temperature performance grade of 64° C., meaning that the binder still possesses adequate physical properties, at least up to 64° C. and down to 22° C.

In the present invention, a mixture has been developed containing between 34 to 80% W asphalt cement. The asphalt cement is dispersed in the form of droplets in an oil in water emulsion. The emulsion also contains emulsifiers generally 0.15-2.5% W of alkyl amines; tallow diamine; quaternary amines; or a combination thereof which are activated by reacting them with acids, for example, hydrochloric, phosphoric, acetic, sulfuric, etc.

The concentration at the oil-water interface is a function of the emulsifier having lipophilic and hydrophilic tendencies. These concentrations are generally between 0.15-2.5% V, and having pH values between 2 and 5. Furthermore, 0-3% calcium chloride, sodium tripolyphosphate and asphalt peptizers are added to control viscosity, promote cohesion and adhesion and controlled settlement. Additional 0-3% latex and other polymers, e.g. styrene-butadiene-styrene (SBS) and styrene-butadiene-rubber (SBR), are added to prevent low temperature cracking and resistance to flow at higher temperatures. Asphalts modified with SBS polymer provide significant improvement in modified asphalt by providing reduced temperature susceptibility and increased flexibility at low temperatures, better resistance to both flow and deformation at high temperatures.

The additives and their percent (by volume) ranges are preferably selected based upon the ambient temperatures conditions at which the asphalt composition is applied and the desired hardness of the composition being applied (i.e. does road surface see light, medium or heavy traffic from point of traffic volume and/or type of traffic such as trucks, heavy equipment, cars, or a combination thereof). By modifying asphalt binders with SBS copolymers, further tensile strength is improved and the modulus of stiffness at high temperatures, adhesion between asphalt and aggregate and greater resistance to surface abrasion is improved. To further promote coating in wet, cold conditions, 0-3% V fatty amidoamine is added to the mixture. 0-3% V of petroleum hydrocarbon, light aromatic hydrocarbon and medium aromatic hydrocarbon is added to enhance mechanical stability. The development of the compound described herein allows use over a broader range of ambient temperatures.

What is claimed is:

1. An asphalt-based mixture comprising, by percent volume (% V):
   15-30% V water;
   34-80% V asphalt cement (AC) being dispersed as asphalt cement droplets, the AC selected from the group consisting of:
   AC-5 Asphalt Mixture; AC-10 Asphalt Mixture; AC-20 Asphalt Mixture; and AC-30 Asphalt Mixture;
   0.15-2.5% V emulsifiers selected from the group consisting of:
   alkyl amines; tallow diamine; quaternary amines; and combinations thereof; and
   further comprising:
   between greater than 0% to 3% of fatty amidoamine to promote coating in wet, cold conditions.

2. The mixture of claim 1, wherein the AC further includes:
   65-70 Pen. Grade Bitumen; and 85-100 Pen. Grade Bitumen; 64-22 Performance Grade Binder; 5-22 Performance Grade Binder; 67-22 Performance Grade Binder; 76-22 Performance Grade Binder; or combinations thereof.

3. The mixture of claim 1, wherein the emulsifiers are activated by interaction with an acid selected from the group consisting of: hydrochloric, phosphoric, acetic, sulfuric, and combinations thereof.

4. The mixture of claim 1, further comprising:
   0.15-2.5 of an additional emulsifier having lipophilic and hydrophilic tendencies and pH values between 2 and 5.

5. The mixture of claim 1, further comprising:
   greater than 0 to 3% V of the group consisting of calcium chloride, sodium tripolyphosphate and asphalt peptizers or combinations thereof, for regulating viscosity.

6. The mixture of claim 1, further comprising:
   greater than 0 to 3% V of: of the group consisting of latex, styrene-butadiene-styrene (SBS); styrene-butadiene-rubber (SBR) or combinations thereof, to prevent low temperature cracking and resistance to flow.

7. An asphalt-based mixture comprising, by percent volume (% V):
   15-30 water;
   34-80 asphalt cement (AC) being dispersed as asphalt cement droplets, the AC selected from the group consisting of:
   AC-5 Asphalt Mixture; AC-10 Asphalt Mixture; AC-20 Asphalt Mixture; and AC-30 Asphalt Mixture;
   0.15-2.5 emulsifiers selected from the group consisting of:
   alkyl amines; tallow diamine; quaternary amines; and combinations thereof; and further comprising:
   greater than 0 to 3% V of petroleum hydrocarbon, light aromatic hydrocarbon and medium aromatic hydrocarbon to enhance mechanical stability.

8. The mixture of claim 1, wherein the fatty amidoamine is 3%.

9. The mixture of claim 7, wherein the petroleum hydrocarbon, light aromatic hydrocarbon and medium aromatic hydrocarbon is 3%.

* * * * *